United States Patent [19]

Downing et al.

[11] Patent Number: 5,702,114
[45] Date of Patent: Dec. 30, 1997

[54] SHOPPING CART HAVING AN INTEGRATED DUAL CHILD SEAT

[75] Inventors: Beth M. Downing, Garland; Jamie D. Downing, Wylie, both of Tex.

[73] Assignee: Downing Investment, L.L.C., Garland, Tex.

[21] Appl. No.: 790,515

[22] Filed: Jan. 29, 1997

Related U.S. Application Data

[63] Continuation-in-part of Ser. No. 575,907, Dec. 20, 1995, abandoned.

[51] Int. Cl.⁶ .................. B62B 1/02; B62D 39/00
[52] U.S. Cl. ............. 280/47.23; 280/2; 280/33.993; 280/DIG. 4; 280/47.35
[58] Field of Search ............ 297/256.17, 248; 280/33.993, 33.992, 33.994, 47.38, 47.35, 2, 43.11, 47.23, 32.6, DIG. 3, DIG. 4; 301/127, 128

[56] References Cited

U.S. PATENT DOCUMENTS

| | | |
|---|---|---|
| D. 263,456 | 3/1982 | Muellner . |
| D. 281,365 | 11/1985 | Gugler . |
| D. 284,326 | 6/1986 | Roney et al. . |
| D. 292,451 | 10/1987 | Jorgenson . |
| D. 335,731 | 5/1993 | Allen .................. 280/47.38 |
| D. 336,993 | 7/1993 | Gray . |
| 2,371,055 | 3/1945 | Le Tourneau .............. 280/2 |
| 3,201,139 | 8/1965 | Turlington ............. 3280/33.994 |
| 3,500,965 | 3/1970 | Nossokoff et al. .......... 280/33.994 |
| 4,046,394 | 9/1977 | Thompson, Jr. .......... 280/33.993 |
| 4,204,695 | 5/1980 | Salzman . |
| 4,858,947 | 8/1989 | Yee et al. . |
| 5,210,968 | 5/1993 | Rehrig .................. 40/308 |
| 5,312,122 | 5/1994 | Doty . |
| 5,350,182 | 9/1994 | Hurst . |
| 5,354,079 | 10/1994 | Hettenbach ............. 280/33.991 |
| 5,435,582 | 7/1995 | Davidson ............... 280/33.992 |

FOREIGN PATENT DOCUMENTS

| | | | |
|---|---|---|---|
| 180233 | 1/1907 | Germany .................. 280/2 |
| 2193692 | 2/1988 | United Kingdom ........... 280/47.38 |

OTHER PUBLICATIONS

Manual: "Installing the Shop-Along" issued by Fourd, Incorporated, National Headquarters, P.O. Box 240326, Apple Valley, MN 55124.

*Primary Examiner*—Brian L. Johnson
*Assistant Examiner*—Avraham H. Lerner
*Attorney, Agent, or Firm*—Warren, Perez & Stephens

[57] ABSTRACT

A shopping cart (12) comprising a frame assembly (28) having a pair of longitudinal frame rails (132, 134) extending between a pair of transverse frame rails (136, 138), a pair of upwardly extending axle tabs (63) for receiving an axle (156) onto which a pair of front wheel assemblies (30) are rotatably attached such that the axis of rotation of the front wheel assemblies (30) is above transverse frame rail (138) and a pair of rear wheel assemblies (30) which are rotatably mounted on fully rotatable casters (152, 154) such that the axis of rotation of the rear wheel assemblies (30) is below the transverse frame rail (136) and above the transverse frame rail (138). The shopping cart (12) further comprises a first child seat (76) and a second child seat (88) adjacent to the first child seat (76) such that a child disposed in the first child seat (76) and a child disposed in the second child seat (88) sit side-by-side facing the driver of the shopping cart (12), the first child seat (76) and the second child seat (88) each comprising a front panel (62), having a right leg opening (80,92) and a left leg opening (78,94), a backrest (94) rotatably coupled to the front panel (62) and a child support panel (72,90) extending between the backrest (94) and the front panel (62), the first child seat (76) and the second child seat (88) having a divider (100) therebetween.

20 Claims, 6 Drawing Sheets

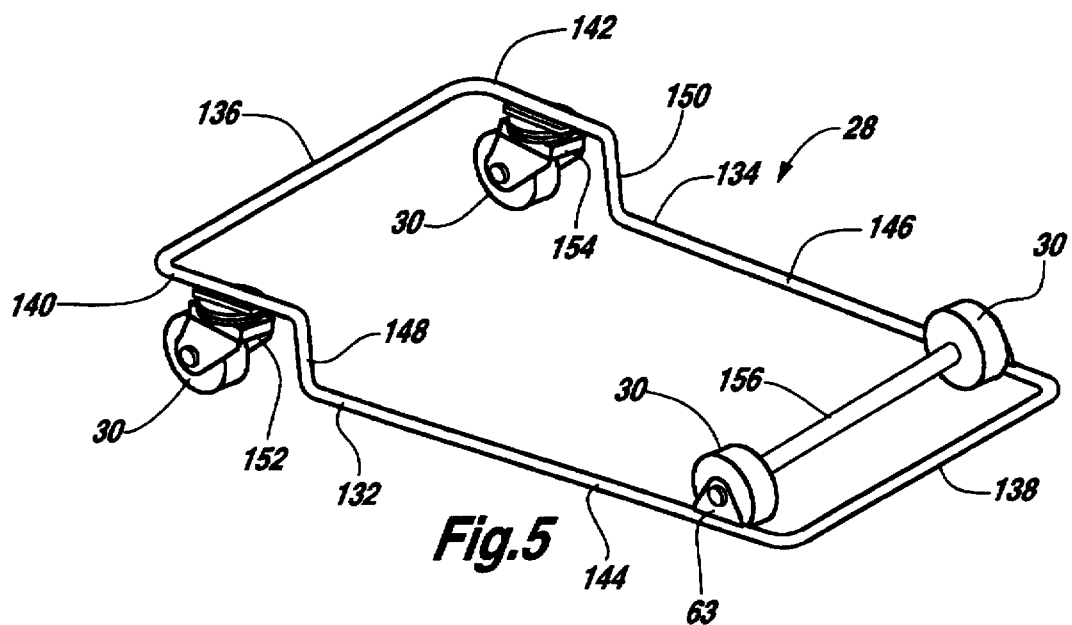
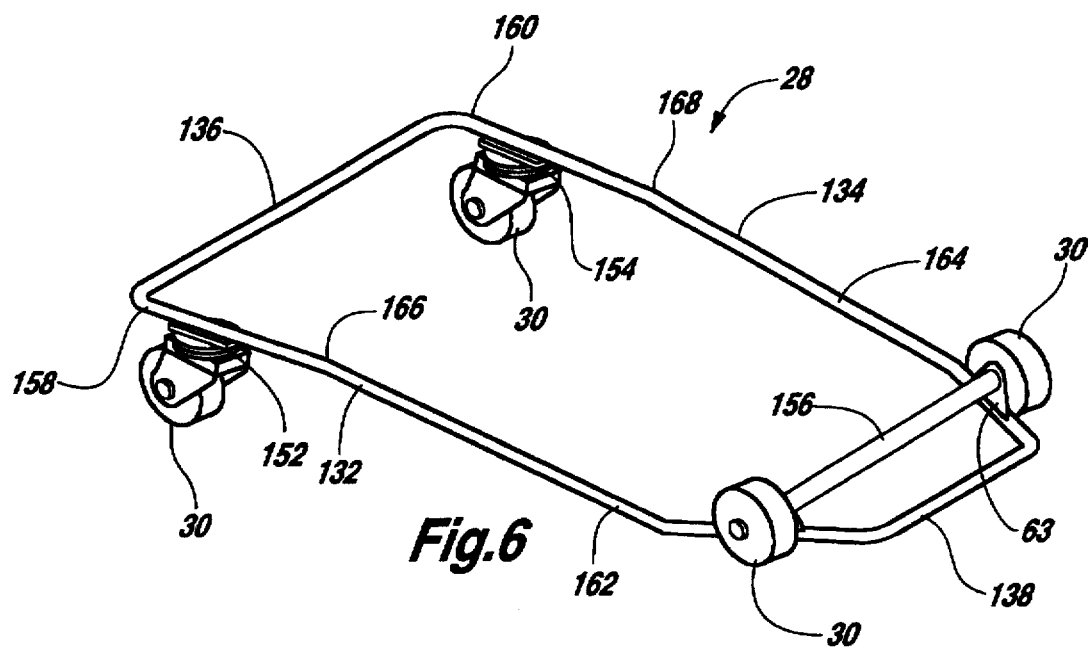

SHOPPING CART HAVING AN INTEGRATED DUAL CHILD SEAT

This application is a continuation-in-part of application Ser. No. 08/575,907 filed Dec. 20, 1995 now abandoned.

TECHNICAL FIELD OF THE INVENTION

This invention relates, in general, to shopping carts and, in particular to, a shopping cart having a lowered center of gravity and having an integrated dual child seat wherein two children sit side-by-side facing the driver of the shopping cart.

BACKGROUND OF THE INVENTION

Heretofore, in this field, shoppers have become accustomed to using shopping carts during trips to the grocery store, the department store and other similar stores. Typically, the shopping carts have a main basket for storing merchandise during a shopping trip, which is supported by a frame having wheels thereunder. Typically, the shopping carts have a gate that is pivotally attached at the posterior end of the main basket proximate the handlebar which allows for the nesting of similarly sized shopping carts, that is, the placement of the front end of one shopping cart within the main basket of another shopping cart to minimize the space requirements of the shopping carts during periods of inactivity or storage.

When the gate is placed in an open position, the gate commonly forms a folding child seat. The folding child seat typically accommodates a single child who faces the driver of the shopping cart. The folding child seat typically has a backrest which provides support for the child's back, a child support panel having a plastic seat cover for supporting the weight of the child, and a pair of leg openings through which the child's legs extend.

Recently, shopping carts have employed child restraint systems to secure the child in the child seat. These restraint systems limit a child's ability to stand up in the child seat, thereby avoiding the possibility of the child falling into the basket and damaging the merchandise therein or falling out of the shopping cart onto the floor or parking lot, which could result in injury to the child. In addition, child restraint systems limit a child's ability to turn around in the child seat. This reduces the possibility that the child will remove goods from the main basket and eventually throw or drop such goods onto the floor, thereby damaging the merchandise or breaking glass containers.

While shopping with a child presents a parent or guardian with certain challenges, the task becomes exponentially more difficult if two young children are present during a shopping trip. As described above, most currently available shopping carts are designed to accommodate only one child. A second child must, therefore, either be placed in the main basket, which utilizes a substantial portion of the storage space, be carried by the parent, or be allowed to walk beside the parent, thereby having the ability to disturb merchandise or wander off unsupervised.

Several attempts have been made to overcome the limitations of shopping carts having only a single child seat. U.S. Pat. No. 5,312,122 describes a shopping cart attachment which converts a conventional shopping cart into a shopping cart having a tandem child seat system. This system requires the addition of an attachment which extends externally outward from the posterior section of the shopping cart such that one child sits in front of the other child, both facing the driver of the shopping cart.

Use of the above-described tandem child seat system, however, has numerous disadvantages. The add on attachment makes the shopping cart difficult to operate, particularly when cornering is required. Also, the add on attachment renders the shopping cart unable to nest with similar shopping carts, thereby occupying a large amount of retail space during storage of the carts and making collection of carts from a parking lot more difficult. In addition, having a first child located behind a second child, encourages the first child to bother the second child by pulling the second child's hair or ears which, in turn, encourages the second child to turn around or stand up in the child seat. This one child behind the other child arrangement, also makes it difficult for a parent to place a child in the child seat located in the main basket and makes it difficult for a parent to supervise both children. Finally, this design requires that a parent walk around the side of the cart in order to place items in the main basket.

In a second design, a conventional shopping cart utilizes an attachment which extends externally outward from the posterior end of the shopping cart which has two child seats that are side-by-side. In this design, the children sitting in the shopping cart attachment face away from the driver of the shopping cart and toward the child sitting in the folding child seat of the shopping cart.

This design, however, shares many of the drawbacks described above. The addition of the shopping cart attachment makes the shopping cart difficult to operate and unable to nest with other similar shopping carts. Also, use of this design makes it difficult for a parent to place a child in the folding child seat of the shopping cart and makes it difficult to supervise that child during the shopping trip. This design further requires that the parent walk around the side of the shopping cart in order to place items in the main basket. In addition, this design provides insufficient seating area for the children in the shopping cart attachment.

Additionally, conventional shopping carts utilize a frame that is mounted on four fully rotatable casters with wheels therein. This design is susceptible to rolling over, particularly when two children are located in the shopping cart.

A need has, therefore, arisen for a shopping cart having the capacity to carry two children, that is roll resistant and nestable with similarly sized shopping carts and that is easy to operate while providing for the safety and the adequate supervision of both children.

SUMMARY OF THE INVENTION

The present invention disclosed herein comprises a shopping cart that is roll resistant and that has the capacity to carry two children in a dual child seat that is integrated into the gate of the shopping cart, thereby allowing for nesting of the easy to operate shopping cart while providing for the safety and the supervision of both children.

The shopping cart having an integrated dual child seat of the present invention comprises a main basket, a gate that is pivotally mounted to the main basket wherein the gate has a front panel and back panel that is pivotally mounted to the front panel, a frame disposed generally below the main basket having a plurality of fully rotatable wheels disposed thereunder, a first and a second child support panel, each extending between the front panel and the back panel, such that when the gate is in an open position, the first child support panel, the front panel and the back panel form a first child seat and the second child support panel, the front panel and the back panel form a second child seat.

The gate has a closed position wherein the first child seat and the second child seat collapse as the back panel is pivoted toward the front panel, thereby expanding the useable area in the main basket. The gate also has a nesting position wherein the first child seat and the second child seat collapse as the back panel is pivoted toward the front panel and wherein the gate is upwardly pivoted to allow nesting of similarly sized shopping carts.

The shopping cart of the present invention has a frame assembly which comprises a pair of longitudinal frame rails having front and rear ends and a pair of transverse frame rails respectively extending between the front ends of the longitudinal frame rails and the rear ends of the longitudinal frame rails. A pair of upwardly extending axle tabs is securably disposed upon the pair of longitudinal frame rails proximate the front end of the longitudinal frame rails. The axle tabs receive an axle on which a pair of front wheels is rotatably disposed such that the axis of rotation of the front wheels is above the front end of the longitudinal frame rails. A pair of fully rotatable casters downwardly extends from the pair of longitudinal frame rails proximate the rear end of the longitudinal frame rails. A pair of rear wheels is rotatably mounted on the casters such that the axis of rotation of the rear wheels is below the rear end of the longitudinal frame rails and above the front end of the longitudinal frame rails whereby the weight of the frame assembly is generally below the axis of rotation of the front wheels and the rear wheels, thereby providing a low center of gravity for the shopping cart and increasing the roll resistance of the shopping cart.

The shopping cart having an integrated dual child seat of the present invention may also include a first seat cover and a second seat cover respectively disposed above the first child support panel and the second child support panel, a lower storage basket disposed below the main basket for isolating selected merchandise, at least one brake for locking the wheels of the shopping cart in place to immobilize the shopping cart, and an amusement bar which is accessible to the children in both the first child seat and the second child seat.

The shopping cart having an integrated dual child seat of the present invention may further include a billboard attached to the main basket for placing advertisements thereon, a child restraint device for securing children within the first child seat and the second child seat and a divider located between the first child seat and the second child seat to separate the child in the first child seat from the child in the second child seat.

In one embodiment of the present invention, the first child seat is the same width as the second child seat to accommodate children of similar size such as twins. In this embodiment, the front panel of the gate has a right leg opening and a left leg opening for each of the child seats wherein each of the leg openings is the same size.

In a second embodiment of the present invention, the first child seat is wider than the second child seat to accommodate children of different sizes or ages. In this embodiment, the right leg opening and the left leg opening of the first child seat may be larger than the right leg opening and the left leg opening of the second child seat.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which:

FIG. 5 is a perspective drawing of the bottom portion of a frame assembly of a shopping cart of the present invention;

FIG. 6 is a perspective view of the bottom portion of a frame assembly of a shopping cart of the present invention;

DETAILED DESCRIPTION OF THE INVENTION

The shopping cart having an integrated dual child seat of the present invention comprises a first child seat and a second child seat that are adjacent to one another wherein a child disposed in the first child seat and a child disposed in the second child seat sit side-by-side, facing the driver of the shopping cart. The shopping cart is easy to operate and is nestable in similarly sized shopping carts, while facilitating supervision of two children.

Figure 1:
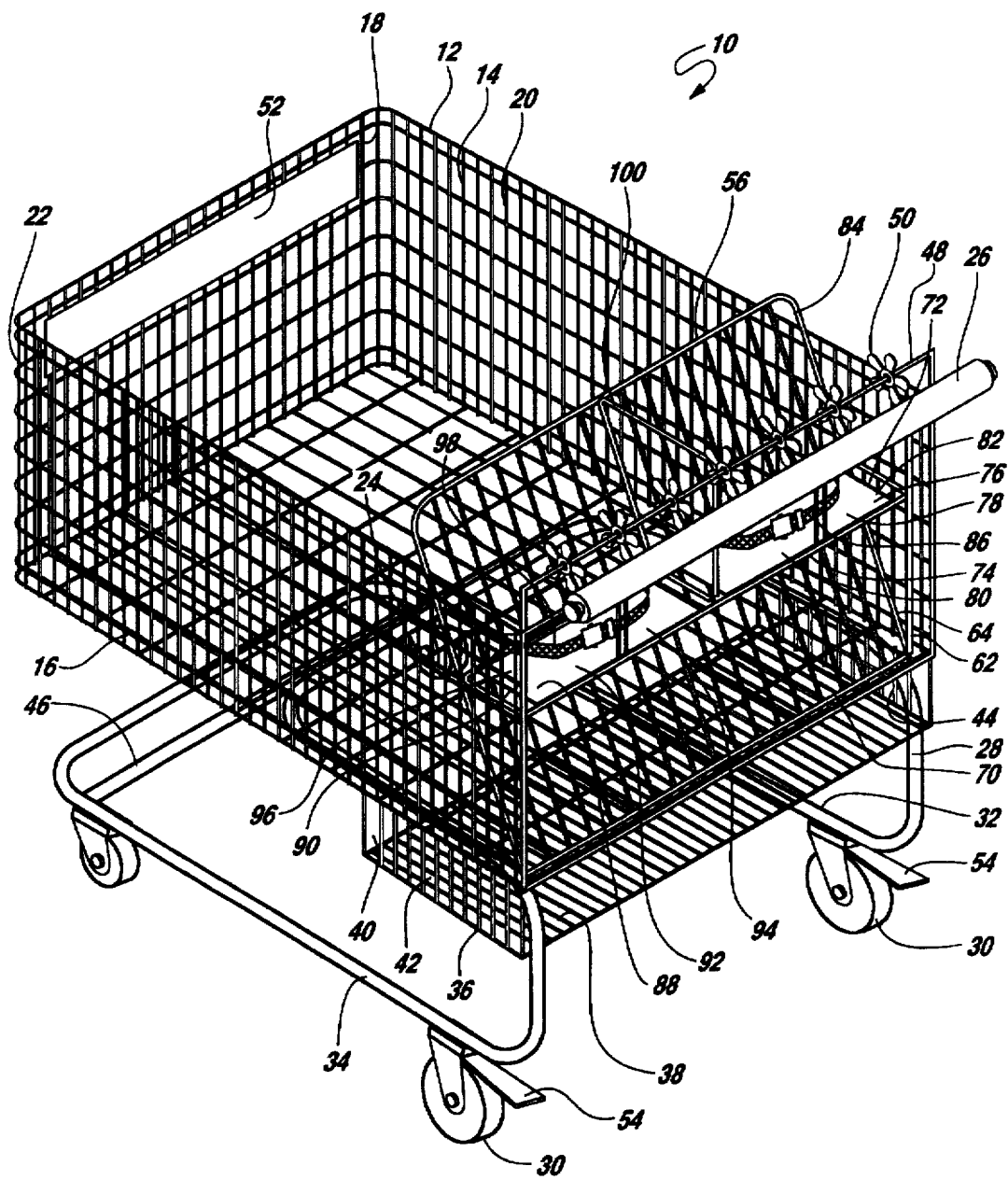
FIG. 1 is a perspective drawing showing one embodiment of the shopping cart having an integrated dual child seat of the present invention.

In FIG. 1, a shopping cart having an integrated dual child seat is generally designated 10. Shopping cart 12 comprises main basket 14 for storage of merchandise selected during a shopping trip. Main basket 14 includes bottom surface 16, front wall 18, side wall 20, side wall 22, and transverse support member 24. Side walls 20, 22 are tapered such that the distance between side wall 20 and sidewall 22 at front wall 18 is less than the distance between sidewall 20 and sidewall 22 at the posterior end of main basket 14. The distance between the top and the bottom of side walls 20, 22 at front wall 18 is less than the distance between the top and the bottom of side walls 20, 22 at the posterior end of main basket 14. Side walls 20, 22 are tapered to facilitate nesting of similarly sized shopping carts during storage.

Shopping cart 12 includes handle bar 26 which extends rearwardly from main basket 14. Frame 28 is disposed generally below main basket 14. A plurality of fully rotatable wheel assemblies 30 are operatably mounted to the bottom of frame 28. Even though FIG. 1 depicts wheel assemblies 30 located below frame 28, it should be understood by one skilled in the art that wheel assemblies 30 could be attached to frame 28 in a variety of locations which are equally well-suited for the present invention including, but not limited to, the outer sides of lower members 32, 34, thereby widening the wheel base of shopping cart 12 and lowering the center of gravity of shopping cart 12 in order to minimize the likelihood that shopping cart 12 will tip over.

Shopping cart 12 further comprises lower storage basket 36 for isolating selected items from main basket 14. Lower storage basket 36 includes bottom surface 38, front wall 40 and sidewalls 42, 44. Even though FIG. 1 depicts lower storage basket 36 as mounted below main basket 14, it should be understood that lower storage basket 36 may be mounted in a variety of locations, which are equally well-suited for the present invention including, but not limited to, on lower members 32, 34 of frame 28 or on transverse frame member 46, in which case, lower storage basket 36 is pivotal about transverse frame member 46 to facilitate nesting of similarly sized shopping carts.

Shopping cart 12 also includes amusement bar 48, transversely extending between sidewall 20 and sidewall 22 near the posterior end of main basket 14. Amusement bar 48 includes a plurality of amusement devices 50. Shopping cart 12 further includes billboard 52 for placing advertisements thereon. Even though FIG. 1 depicts billboard 52 as located on front wall 18, it should be understood by one skilled in the art that billboard 52 may be positioned in a variety of locations which are equally well-suited for the present invention including, but not limited to, sidewall 20 and sidewall 22.

Wheel assemblies 30 of shopping cart 12 further include braking system 54. Braking system 54 locks wheels 30 in place in order to immobilize shopping cart 12 when the driver of shopping cart 12 desires shopping cart 12 to remain stationary.

Shopping cart 12 also includes gate 56 which is pivotally coupled with main basket 14 about transverse support member 24. Gate 56 comprises front panel 62 and back panel 64 which is pivotally coupled with front panel 62 about transverse member 70. Child support panel 72 extends between front panel 62 and back panel 64 of gate 56. Child support panel 72 is pivotally coupled with transverse member 74 of front panel 62 and is slidably engaged with back panel 64. Together, front panel 62, back panel 64 and child support panel 72 form child seat 76.

Child seat 76 includes leg openings 78, 80 and seat cover 82. Child seat 76 also includes child restraint 84 which comprises a pair of adjustable length straps 86 for securing a child against back panel 64, thereby preventing the child from standing up or turning around in child seat 76. Adjustable straps 86 each further include an upper and lower portion, each of which having a corresponding connecting element secured thereto, such as interlocking male and female connectors. Even though FIG. 1 depicts child restraint 84 as including a pair of adjustable length straps 86, it should be understood by one skilled in the art that a variety of child restraint devices are equally well-suited for the present invention including, but not limited to, an adjustable lap belt.

Adjacent to child seat 76 is child seat 88. Child seat 88 is formed by child support panel 90, front panel 62 and back panel 64. Child support panel 90 is pivotally connected to transverse member 74 of front panel 62 and slidably engaged with back panel 64. Child seat 88 further includes leg openings 92, 94, seat cover 96 and child restraint 98. Between child seat 76 and child seat 88 is divider 100 for separating a child in child seat 76 from a child in child seat 88. Divider 100 may be pivotally and slidably coupled with back panel 64, such that when gate 56 is in an open position, divider 100 is pivoted to a longitudinal position and moved downwardly into a locking position.

Figure 2:
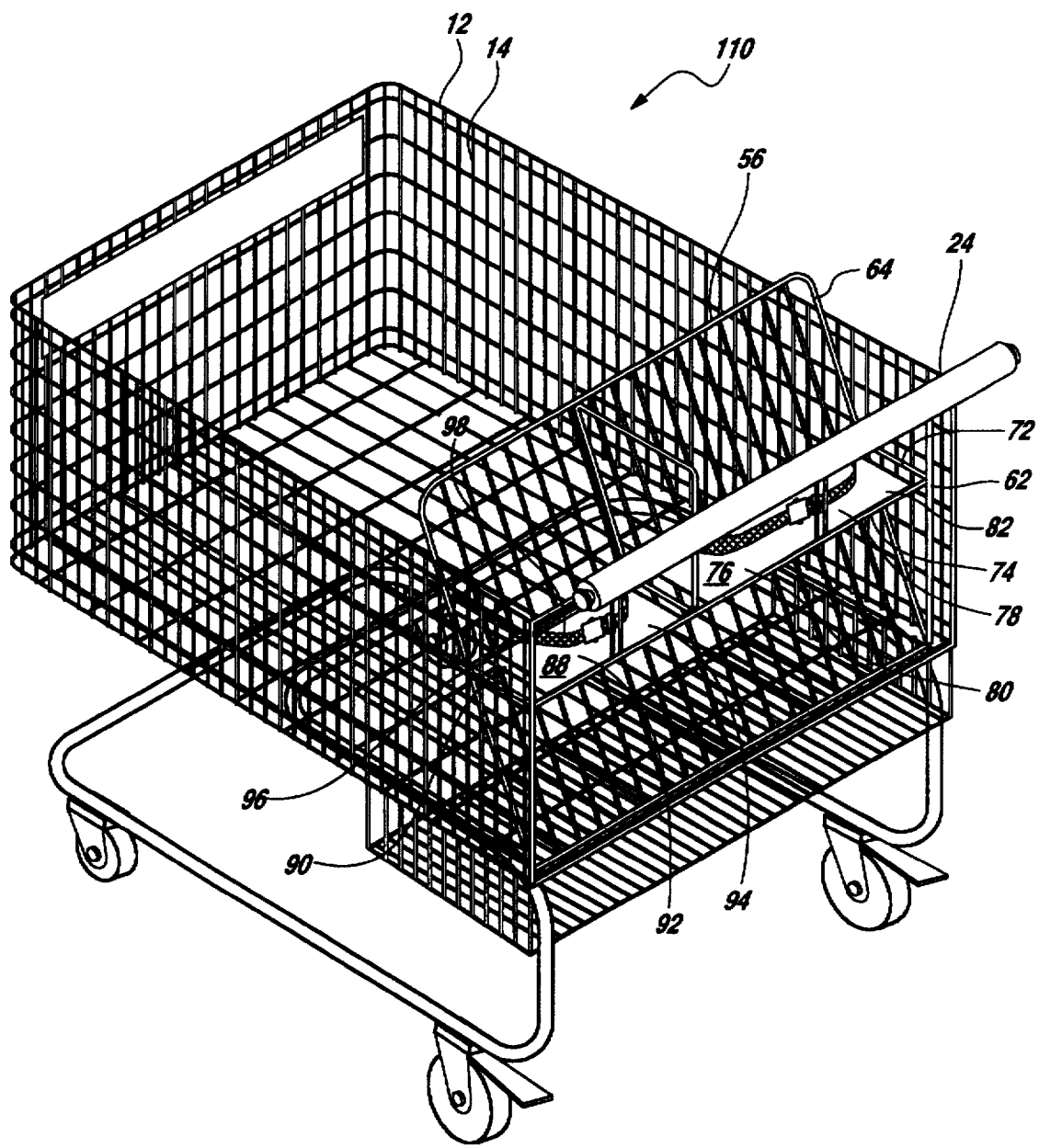
FIG. 2 is a perspective drawing showing another embodiment of the shopping cart having an integrated dual child seat of the present invention.

Referring to FIG. 2, an alternate embodiment of a shopping cart having an integrated dual child seat is generally designated 110. Shopping cart 12 includes main basket 14 and gate 56 which is pivotally coupled to main basket 14 about transverse support member 24. Gate 56 incudes front panel 62, back panel 64, child support panel 72, and child support panel 90. Child support panels 72, 90 are pivotally coupled with transverse member 74 and slidably engaged with back panel 64. Front panel 62, back panel 64 and child support panel 72 form child seat 76. Front panel 62, back panel 64 and child support panel 90 form child seat 88. Child seat 72 is wider than child seat 88 in order to accommodate two children of different sizes or ages. Child seat 72 further includes leg openings 78, 80 and seat cover 82 which may be wider than leg openings 92, 94 and seat cover 96 of child seat 88, respectively.

Figure 3:
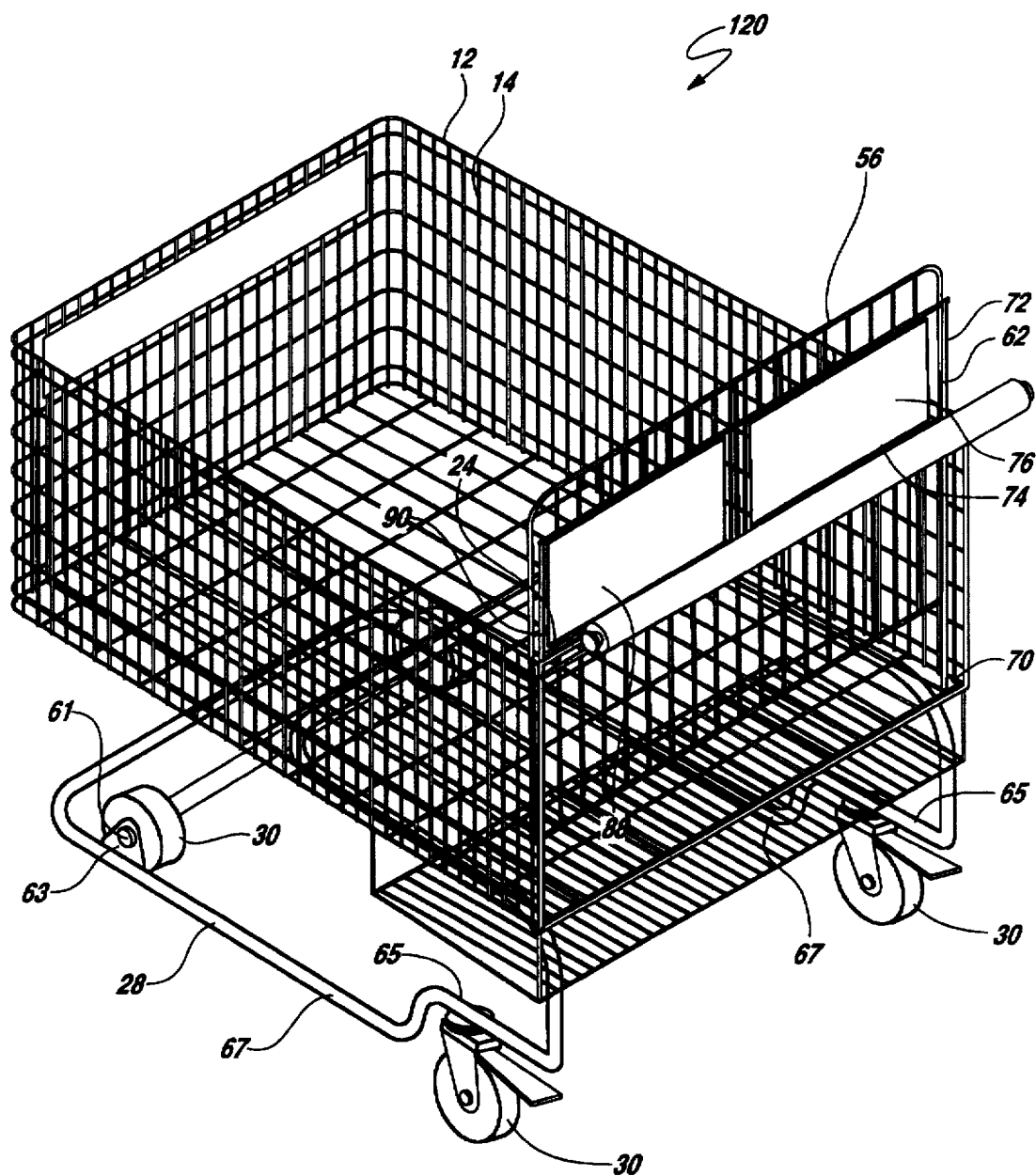
FIG. 3 is a perspective drawing showing the gate of the shopping cart having an integrated dual child seat of the present invention in the closed position.

Referring to FIG. 3, the shopping cart having an integrated dual child seat of the present invention is generally designated 120. Shopping cart 12 includes main basket 14 and gate 56 which is pivotally coupled to main basket 14 about transverse support member 24. Gate 56 is depicted in a closed position wherein child seats 76, 88 are collapsed as back panel 64 is pivoted toward front panel 62 about transverse member 70. As back panel 64 is pivoted toward front panel 62, child support panels 72, 90 pivot about transverse member 74 and slide upwardly along back panel 64 such that the space between back panel 64 and front panel 62 is minimized, thereby maximizing the useable area within main basket 14.

In one embodiment of the present invention, front wheel assemblies 30 are rotatably mounted on axle 61 which extends transversely between two frame tabs 63 located on either side of the front end of frame 28. Front wheel assemblies 30 are mounted outside and partially above lower member 67 of frame 28 to provide a wider wheel base and a lower center of gravity to shopping cart 12, thereby reducing the likelihood that shopping cart 12 will tip over. Posterior wheel assemblies 30 are rotatably mounted on frame extension members 65 which extends longitudinally beyond the posterior end of frame 28. Posterior wheel assemblies 30 are mounted partially above lower member 67 of frame 28 to provide a lower center of gravity to shopping cart 12, thereby further reducing the likelihood that shopping cart 12 will tip over.

Figure 4:
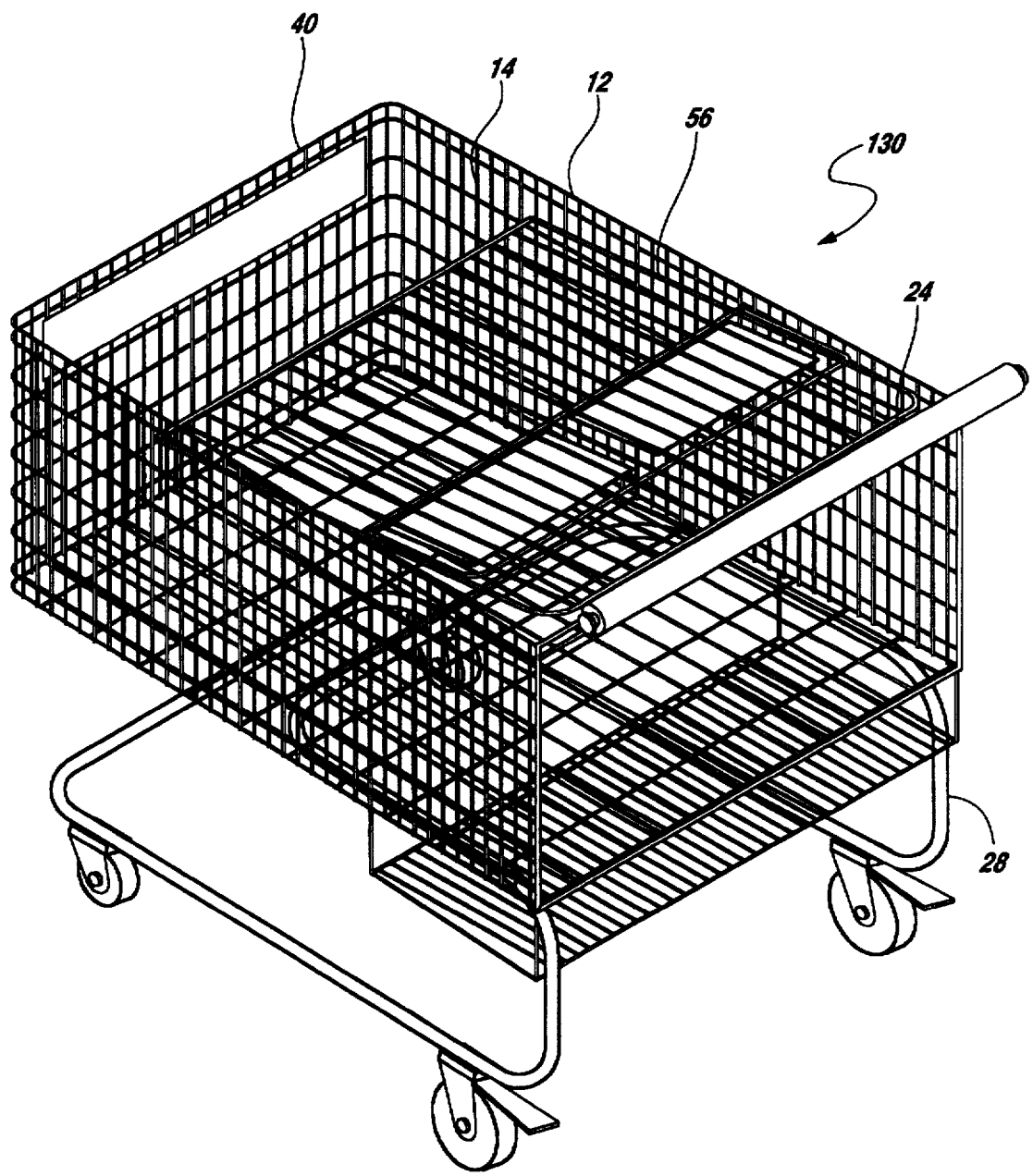
FIG. 4 is a perspective drawing showing the gate of the shopping cart having an integrated dual child seat of the present invention in the nesting position.

Referring to FIG. 4, the shopping cart having an integrated dual child seat of the present invention is generally designated 130. Shopping cart 12 includes main basket 14 and gate 56 which is pivotally coupled to main basket 14 about transverse support member 24. Gate 56 is depicted in the closed position as described in reference to FIG. 3. In addition, gate 56 is upwardly pivoted about transverse support member 24 toward front wall 40 in order to allow nesting of similarly sized shopping carts during storage.

Referring to FIG. 5, a perspective representation of the lower portion of frame 28 is depicted. Frame 28 includes a pair of longitudinal frame rails 132, 134 and a pair of transverse frame rails 136, 138. Longitudinal frame rails 132, 134 include upper members 140, 142, lower members 144, 146 and adapter members 148, 150. A pair of fully-rotatable casters 152, 154 extend downwardly from upper member 140 and upper member 142, respectively. Rear wheel assemblies 30 are rotatably attached to casters 152, 154 which provide for rear wheel steering of shopping cart 10. Tabs 63 extend upwardly from lower member 144 and lower member 146, respectively. Axle 156 extends between tabs 63. Front wheel assemblies 30 are rotatably mounted on axle 156. The axes of rotation of front wheel assemblies 30 and rear wheel assembles 30 are above transverse frame rail 138 placing the weight of frame 28 generally below the axes of rotation and making shopping cart 10 roll resistant.

In FIG. 6, the lower portion of frame 28 is depicted. Longitudinal frame rails 132, 134 extend between and attach to transverse frame rails 136, 138. Rear wheel assemblies 30 are attached to fully rotatable casters 152, 154 to provide for turning of shopping cart 10. Front wheel assemblies 30 are rotatably mounted to axle 156 which is secured to frame 28 by tabs 63 which extend upwardly from longitudinal frame rails 132, 134. Longitudinal frame rails 132, 134 include rear portions 158, 160 and front portions 162, 164. Front portions 162, 164 slope downwardly from bends 166, 168 to transverse frame rail 138. In this embodiment, only a single bend 166, 168 in required in each longitudinal frame rail 132, 134 in order to have rear wheel assemblies 30 below transverse frame rail 136 and have the axis of rotation of front wheel assemblies 30 above transverse frame rail 138.

Figure 7:
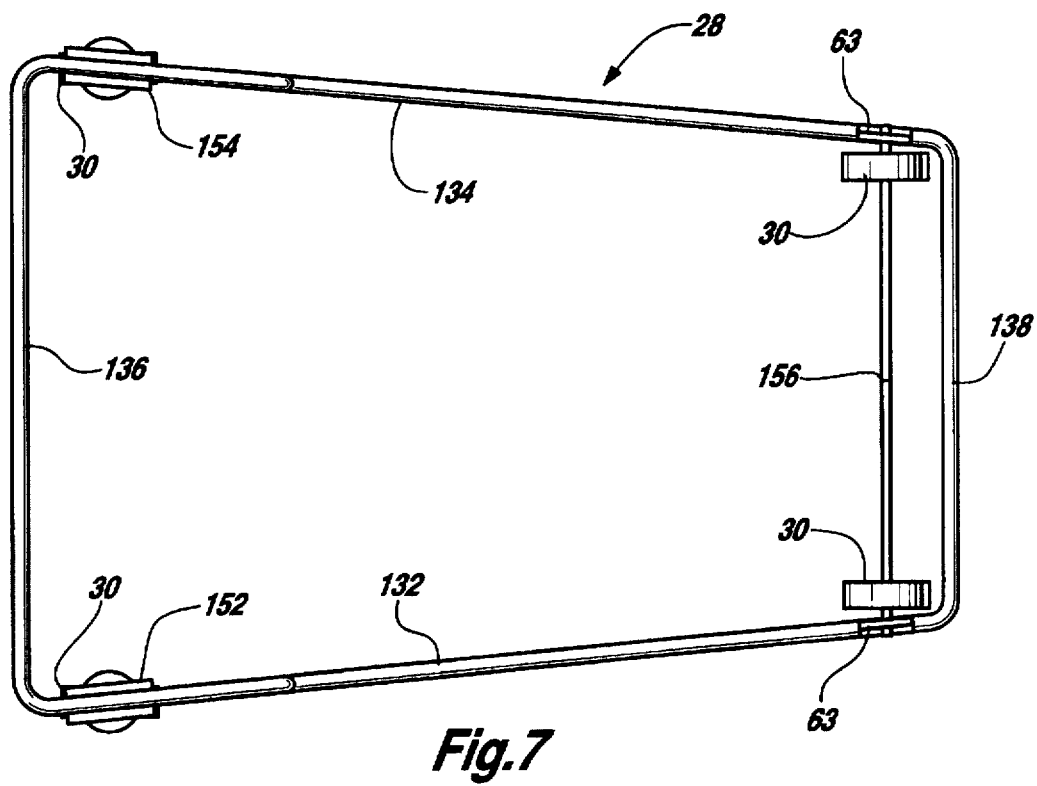
FIG. 7 is a top view of the bottom section of a frame assembly of a shopping cart of the present invention.

FIG. 7 is a top view of the lower portion of frame 28. Frame 28 includes longitudinal frame rails 132, 134 and transverse frame rails 136, 138. Frame 28 also includes rear wheel assemblies 30 which are rotatably mounted on fully rotatable casters 152, 154. Front wheel assemblies 30 are mounted on axle 156 and are inboard of frame rails 132, 134. Transverse frame rail 138 is shorter than transverse frame rail 136 which facilitates nesting of similarly designed shopping carts.

Figure 8:
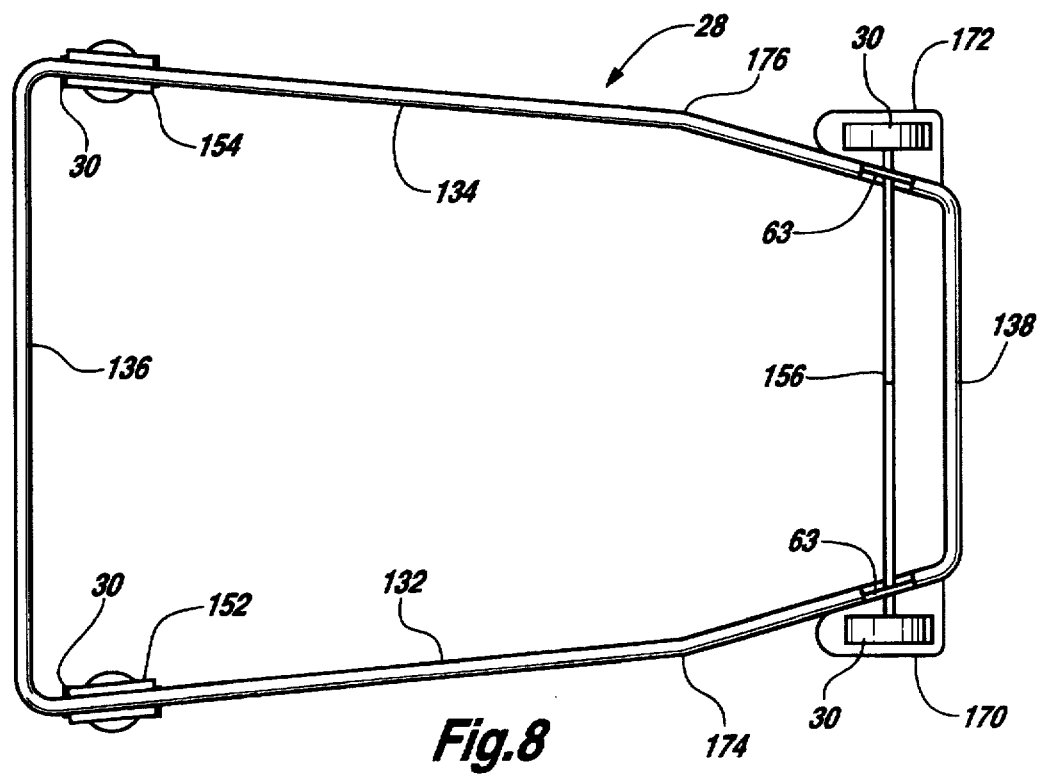
FIG. 8 is a top view of the bottom portion of a frame assembly of a shopping cart of the present invention.

In FIG. 8, frame 28 includes longitudinal frame rails 132, 134 extending between transverse frame rails 136 and 138. Rear wheel assemblies 30 are rotatable within casters 152, 154 thereby providing for rear steering of shopping cart 10. Front wheel assemblies 30 are disposed outboard of longitudinal frame rails 132, 134 and are rotatable about axle 156 which extends between tabs 63. Wheel guards 170, 172 are attached to longitudinal frame rail 132 and longitudinal frame rail 134, respectively. Wheel guards 170, 172 are disposed about front wheel assemblies 30 to protect front wheel assemblies 30 from contact with foreign objects. This embodiment provides for a wider front wheel base to further stabilize shopping cart 10. Transverse frame rail 138 is narrower than transverse frame rail 136 so that shopping cart 10 may be nested with similarly designed shopping carts. Also, to further facilitate nesting, longitudinal frame rails 132, 134 may include bends 174, 176.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A shopping cart of the type having a basket with a bottom surface, a front wall, a pair of side walls and a gate pivotally mounted to serve as a rear wall movable between an operating position and a nesting position, the basket positioned above and securably attached to a frame assembly for supporting the basket the frame assembly comprising:

a pair of longitudinal frame rails having front ends generally disposed beneath the front wall of the basket and rear ends generally disposed beneath the rear wall of the basket;

a pair of transverse frame rails respectively extending between the front ends of the longitudinal frame rails and the rear ends of the longitudinal frame rails;

a pair of upwardly extending axle tabs securably disposed upon the pair of longitudinal frame rails such that one of the pair of axle tabs is proximate the front end of each of the longitudinal frame rails;

an axle extending generally between the axle tabs and above the front end of the longitudinal frame rails;

a pair of front wheels rotatably disposed on opposite ends of the axle such that the axis of rotation of the front wheels is above the front end of the longitudinal frame rails;

a pair of fully rotatable casters downwardly extending from and securably disposed beneath the pair of longitudinal frame rails such that one of the pair of fully rotatable casters is proximate the rear end of each of the longitudinal frame rails; and a pair of rear wheels each rotatably mounted within one of the fully rotatable casters such that the axis of rotation of the rear wheels is below the rear end of the longitudinal frame rails and above the front end of the longitudinal frame rails;

whereby the weight of the frame assembly is generally below the axes of rotation of the front wheels and the rear wheels thereby providing a low center of gravity for the shopping cart and increasing the roll resistance of the shopping cart.

2. The shopping cart as recited in claim 1 wherein said front wheels are disposed outside the longitudinal frame rails thereby widening the wheel base of the front wheel.

3. The shopping cart as recited in claim 2 further comprising a pair of wheel guards securably attached to the longitudinal frame rails and disposed about the front wheels to protect the front wheels from contact with foreign objects.

4. The shopping cart as recited in claim 1 wherein said front wheels are disposed inside the longitudinal frame rails.

5. The shopping cart as recited in claim 1 wherein the longitudinal frame rails further comprise an upper member, a lower member and an adaptor member having first and second ends, the upper member and the lower member are generally parallel with one another, the upper member extending from the rear end of the longitudinal frame rail to the first end of the adaptor member, the lower member extending from the front end of the longitudinal frame rail to the second end of the adaptor member such that the rear wheels are below the upper member and the axis of rotation of the front wheels is above the lower member.

6. The shopping cart as recited in claim 1 wherein the transverse frame rail extending between the front ends of the longitudinal frame rails is narrower than the transverse frame rail extending between rear ends of the longitudinal frame rails, thereby facilitating nesting the similarly designed shopping carts.

7. The shopping cart as recited in claim 1 further comprising a first child seat and a second child seat adjacent to the first child seat such that a child disposed in the first child seat and a child disposed in the second child seat sit side-by-side facing the driver of the shopping cart.

8. The shopping cart as recited in claim 1 wherein said first child seat is wider than said second child seat.

9. A shopping cart comprising:

a basket;

a gate pivotally coupled with said main basket, said gate having a front panel and a back panel, said back panel pivotally coupled with said front panel, said gate having an open position;

a first child support panel extending between said front panel and said back panel such that when said gate is in said open position said first child support panel, said front panel and said back panel form a first child seat;

a second child support panel extending between said front panel and said back panel such that when said gate is in said open position said second child support panel, said front panel and said back panel form a second child seat; and a frame assembly disposed generally below said basket for supporting said basket, the frame assembly comprising:

a pair of longitudinal frame rails having front ends generally disposed beneath the front wall of the basket and rear ends generally disposed beneath the rear wall of the basket;

a pair of transverse frame rails respectively extending between the front ends of the longitudinal frame rails and the rear ends of the longitudinal frame rails;

a pair of upwardly extending axle tabs securably disposed upon the pair of longitudinal frame rails such that one of the pair of axle tab is proximate the front end of each of the longitudinal frame rails;

an axle extending generally between the axle tabs and above the front end of the longitudinal frame rails;

a pair of front wheels rotatably disposed on opposite ends of the axle such that the axis of rotation of the front wheels is above the front end of the longitudinal frame rails;

a pair of fully rotatable casters downwardly extending from and securably disposed beneath the pair of longitudinal frame rails such that one of the pair of fully rotatable casters is proximate the rear end of each of the longitudinal frame rails; and a pair of rear wheels each rotatably mounted within one of the fully rotatable casters such that the axis of rotation of the rear wheels is below the rear end of the longitudinal frame rails and above the front end of the longitudinal frame rails;

whereby the weight of the frame assembly is generally below the axes of rotation of the front wheels and the rear wheels thereby providing a low center of gravity for the shopping cart and increasing the roll resistance of the shopping cart.

10. The shopping cart as recited in claim 9 wherein said front wheels are disposed outside the longitudinal frame rails thereby widening the wheel base of the front wheel.

11. The shopping cart as recited in claim 10 further comprising a pair of wheel guards securably attached to the longitudinal frame rails and disposed about the front wheels to protect the front wheels from contact with foreign objects.

12. The shopping cart as recited in claim 9 wherein said front wheels are disposed inside the longitudinal frame rails.

13. The shopping cart as recited in claim 9 wherein the longitudinal frame rails further comprise an upper member, a lower member and an adaptor member having first and second ends, the upper member and the lower member are generally parallel with one another, the upper member extending from the rear end of the longitudinal frame rail to the first end of the adaptor member, the lower member extending from the front end of the longitudinal frame rail to the second end of the adaptor member such that the rear wheels are below the upper member and the axis of rotation of the front wheels is above the lower member.

14. The shopping cart as recited in claim 9 wherein the transverse frame rail extending between the front ends of the longitudinal frame rails is narrower than the transverse frame rail extending between rear ends of the longitudinal frame rails, thereby facilitating nesting the similarly designed shopping carts.

15. The shopping cart as recited in claim 9 wherein said first child seat is wider than said second child seat.

16. The shopping cart as recited in claim 9 wherein said gate further has a closed position wherein said first child seat and said second child seat collapse as said back panel is pivoted toward said front panel, thereby expanding the useable area in said shopping cart.

17. The shopping cart as recited in claim 9 wherein said gate further has a nesting position wherein said first child seat and said second child seat collapse as said back panel is pivoted toward said front panel and wherein said gate is upward pivoted to allow nesting of similarly sized shopping carts.

18. The shopping cart as recited in claim 9 further comprising a lower storage basket disposed below said basket for isolated selected merchandise.

19. The shopping cart as recited in claim 9 further comprising at least one brake proximate at least one wheel for immobilizing the shopping cart.

20. The shopping cart as recited in claim 9 wherein said first child seat and said second child seat each further comprising a child restraint device for securing a child within said seats.

* * * * *